US009609387B2

(12) United States Patent
Nagamine et al.

(10) Patent No.: US 9,609,387 B2
(45) Date of Patent: Mar. 28, 2017

(54) COMMUNICATION DEVICE, COMMUNICATION SYSTEM, AND COMMUNICATION CONTROL METHOD

(71) Applicants: Shoh Nagamine, Kanagawa (JP); Takuya Imai, Tokyo (JP); Kenichiro Morita, Tokyo (JP)

(72) Inventors: Shoh Nagamine, Kanagawa (JP); Takuya Imai, Tokyo (JP); Kenichiro Morita, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/735,527

(22) Filed: Jun. 10, 2015

(65) Prior Publication Data

US 2015/0365727 A1    Dec. 17, 2015

(30) Foreign Application Priority Data

Jun. 17, 2014   (JP) ................................ 2014-124519

(51) Int. Cl.
*H04N 21/462*   (2011.01)
*H04N 21/61*    (2011.01)
(Continued)

(52) U.S. Cl.
CPC ......... *H04N 21/4621* (2013.01); *H04N 7/147* (2013.01); *H04N 19/46* (2014.11); *H04N 21/4405* (2013.01); *H04N 21/6181* (2013.01)

(58) Field of Classification Search
USPC ................................................. 725/105–106
See application file for complete search history.

(56) References Cited

U.S. PATENT DOCUMENTS 8,185,927 B2 *   5/2012   Karaoguz ............ H04N 21/235
                                                                725/105
8,279,260 B2 *  10/2012   Civanlar ................ H04N 7/152
                                                                348/14.09
(Continued)

FOREIGN PATENT DOCUMENTS

JP         2012-134874        7/2012
JP         2013-030852        2/2013
WO      WO 2015/129319 A1     9/2015

OTHER PUBLICATIONS

Extended European Search Report issued Oct. 16, 2015 in Patent Application No. 15172100.8.

*Primary Examiner* — Nasser Goodarzi
*Assistant Examiner* — Fred Peng
(74) *Attorney, Agent, or Firm* — Oblon, McClelland, Maier & Neustadt, L.L.P.

(57) ABSTRACT

A communication device that receives, from a different communication device, video data being encoded in a scalable manner, decodes received video data, and reproduces and outputs the video data, that comprises: a subjective-quality information acquiring unit acquiring subjective quality information where a combination of values of multiple items related to a coding setting of video data is related to an evaluation result of a subjective quality with regard to video data; a determining unit determining levels of priority of the items in accordance with one of a purpose of video data received from the different device and a user's setting operation; a generating unit generating coding setting information for determining a coding setting of video data received from the different device in accordance with the subjective quality information and the levels of priority of the items; and a notifying unit notifying the coding setting information to the difference device.

11 Claims, 13 Drawing Sheets

(51) Int. Cl.
*H04N 21/4405* (2011.01)
*H04N 19/46* (2014.01)
*H04N 7/14* (2006.01)

(56) References Cited

U.S. PATENT DOCUMENTS

| | | | |
|---|---|---|---|
| 2007/0157260 A1* | 7/2007 | Walker | H04N 7/163 |
| | | | 725/86 |
| 2007/0200923 A1 | 8/2007 | Eleftheriadis et al. | |
| 2007/0230566 A1 | 10/2007 | Eleftheriadis et al. | |
| 2008/0068446 A1 | 3/2008 | Barkley et al. | |
| 2008/0158339 A1 | 7/2008 | Civanlar et al. | |
| 2008/0211901 A1 | 9/2008 | Civanlar et al. | |
| 2014/0118475 A1 | 5/2014 | Nagamine et al. | |
| 2014/0240450 A1 | 8/2014 | Morita et al. | |
| 2014/0289787 A1* | 9/2014 | Minemura | H04N 21/4126 |
| | | | 725/116 |
| 2014/0362718 A1 | 12/2014 | Nagamine et al. | |
| 2014/0368410 A1 | 12/2014 | Imai et al. | |

* cited by examiner

FIG.7A

| PURPOSE | ESTIMATED TRANSMISSION BIT RATE | SPATIAL RESOLUTION | FRAME RATE |
|---|---|---|---|
| CONFERENCE | 1000 Kbps | 1280×720 | 30 fps |

FIG.7B

| PURPOSE | ESTIMATED TRANSMISSION BIT RATE | SPATIAL RESOLUTION | FRAME RATE |
|---|---|---|---|
| REMOTE MEDICAL CARE | 2000 Kbps | 640×360 | 30 fps |

FIG.7C

| PURPOSE | ESTIMATED TRANSMISSION BIT RATE | SPATIAL RESOLUTION | FRAME RATE |
|---|---|---|---|
| VIDEO DELIVERY | 500 Kbps | 800×450 | 60 fps |

FIG.8

SUBJECTIVE-QUALITY INFORMATION MANAGEMENT DB ~1100

| NUMBER | BIT RATE | SPATIAL RESOLUTION | FRAME RATE | SPATIAL-RESOLUTION LAYER NUMBER |
|---|---|---|---|---|
| 1 | 1000 Kbps | 1280×720 | 30 fps | 1 |
| 2 | 1000 Kbps | 1280×720 | 30 fps | 2 |
| 3 | 1000 Kbps | 1280×720 | 30 fps | 3 |
| 4 | 1000 Kbps | 1280×720 | 15 fps | 1 |
| 5 | 1000 Kbps | 1280×720 | 15 fps | 2 |
| 6 | 1000 Kbps | 1280×720 | 15 fps | 3 |
| 7 | 1000 Kbps | 960×540 | 30 fps | 1 |
| 8 | 1000 Kbps | 960×540 | 30 fps | 2 |
| 9 | 1000 Kbps | 960×540 | 30 fps | 3 |
| 10 | 1000 Kbps | 960×540 | 15 fps | 1 |
| 11 | 1000 Kbps | 960×540 | 15 fps | 2 |
| 12 | 1000 Kbps | 960×540 | 15 fps | 3 |
| ⋮ | ⋮ | ⋮ | ⋮ | ⋮ |

FIG.12

| PURPOSE | REPRODUCTION-QUALITY PRIORITY LEVEL | ERROR RESILIENCE | EMPHASIZED SETTING |
|---|---|---|---|
| CONFERENCE | 1.SPATIAL RESOLUTION 2.FRAME RATE | MEDIUM | REPRODUCTION QUALITY |

FIG.13

| NUMBER | BIT RATE | SPATIAL RESOLUTION | FRAME RATE | SPATIAL-RESOLUTION LAYER NUMBER |
|---|---|---|---|---|
| 2 | 1000 Kbps | 1280×720 | 30 fps | 2 |
| 3 | 1000 Kbps | 1280×720 | 30 fps | 3 |
| 1 | 1000 Kbps | 1280×720 | 30 fps | 1 |
| 5 | 1000 Kbps | 1280×720 | 15 fps | 2 |
| ⋮ | ⋮ | ⋮ | ⋮ | ⋮ |

FIG.14

| PURPOSE | REPRODUCTION-QUALITY PRIORITY LEVEL | ERROR RESILIENCE | EMPHASIZED SETTING |
|---|---|---|---|
| REMOTE MEDICAL CARE | 1.SPATIAL RESOLUTION<br>2.FRAME RATE | HIGH | ERROR RESILIENCE |

FIG.15

| NUMBER | BIT RATE | SPATIAL RESOLUTION | FRAME RATE | SPATIAL-RESOLUTION LAYER NUMBER |
|---|---|---|---|---|
| 3 | 1000 Kbps | 1280×720 | 30 fps | 3 |
| 6 | 1000 Kbps | 1280×720 | 15 fps | 3 |
| 9 | 1000 Kbps | 960×540 | 30 fps | 3 |
| 12 | 1000 Kbps | 960×540 | 15 fps | 3 |
| ⋮ | ⋮ | ⋮ | ⋮ | ⋮ |

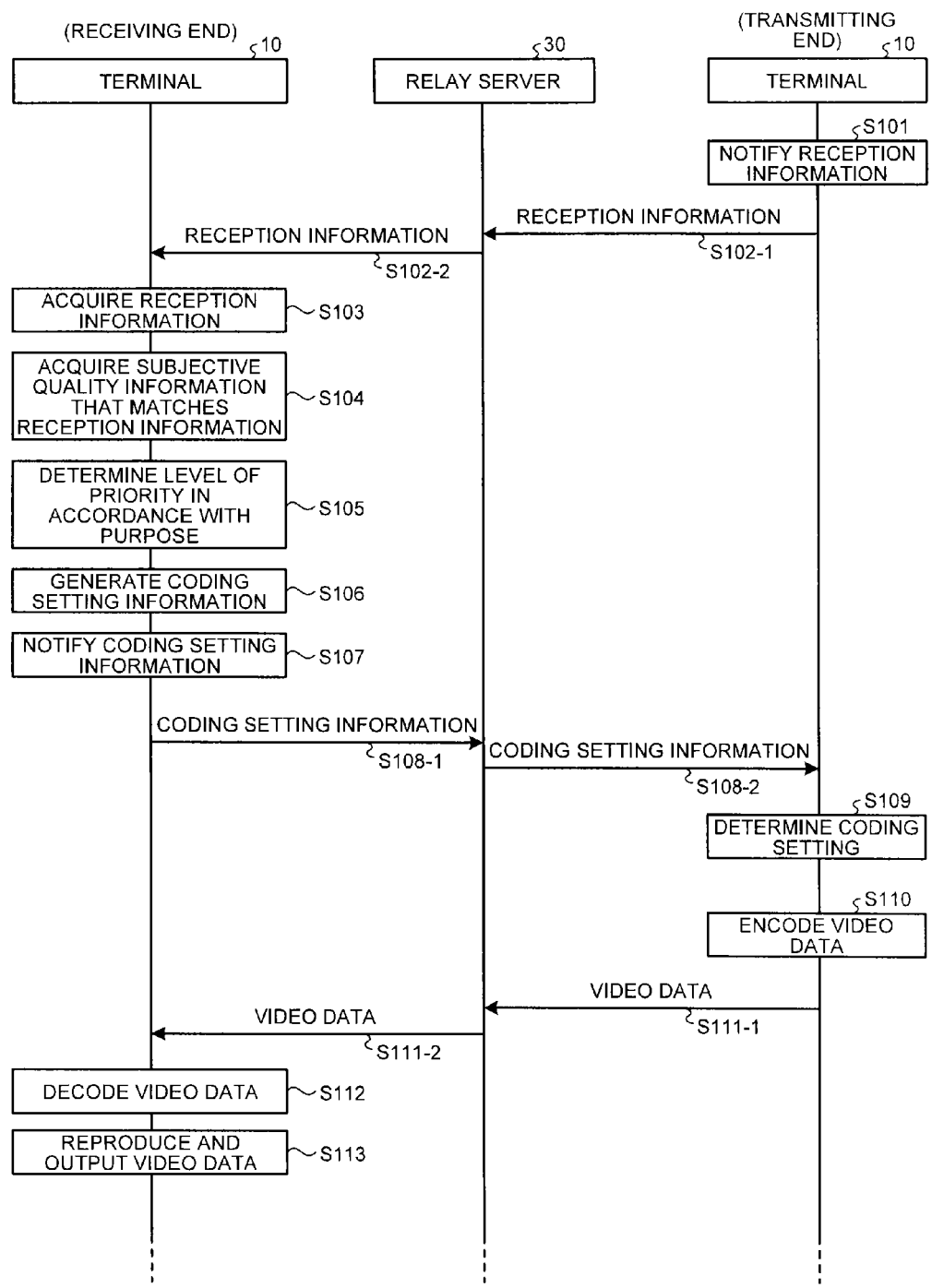

COMMUNICATION DEVICE, COMMUNICATION SYSTEM, AND COMMUNICATION CONTROL METHOD

CROSS-REFERENCE TO RELATED APPLICATION(S)

The present application claims priority to and incorporates by reference the entire contents of Japanese Patent Application No. 2014-124519 filed in Japan on Jun. 17, 2014.

BACKGROUND OF THE INVENTION

1. Field of the Invention

The present invention relates to a communication device, a communication system, and a communication control method.

2. Description of the Related Art

With regard to communication systems, such as teleconference systems for conducting remote conferences using communication networks, there are technologies for transmitting and receiving video data that is encoded by using a scalable coding format, such as the H.264/SVC format, between communication devices that are terminals.

Japanese Laid-open Patent Publication No. 2013-30852 discloses the method for obtaining a higher subjective quality (quality of experience (QoE), also referred to as "user's quality of experience") with regard to the selection of scalability for encoding video data. According to the technology that is disclosed in Japanese Laid-open Patent Publication No. 2013-30852, the transmitting end, which encodes and transmits video data, selects multiple selectable spatial/temporal layers during reproduction from the subjective quality database that stores the relationship between the spatial resolution and the frame rate with respect to the bit rate and the evaluation result of the subjective quality. Then, scalable video coding is applied to input original video by using any scalable video coding method.

However, the technology disclosed in Japanese Patent Application Laid-open No. 2013-30852 has a problem in that the coding setting of video data is determined on the basis of the subjective quality that is determined by the transmitting end that transmits the video data and therefore the coding setting does not reflect the intentions of the receiving end that actually reproduces and outputs the video data.

SUMMARY OF THE INVENTION

It is an object of the present invention to at least partially solve the problems in the conventional technology.

According to the present invention, there is provided a communication device that receives, from a different communication device, video data that is encoded in a scalable manner, decodes received video data, and reproduces and outputs decoded video data, the communication device comprising: a subjective-quality information acquiring unit that acquires subjective quality information in which a combination of values of multiple items related to a coding setting of video data is related to an evaluation result of a subjective quality with regard to video data; a determining unit that determines levels of priority of the items in accordance with at least any one of a purpose of video data that is received from a different communication device and a user's setting operation; a generating unit that generates coding setting information for determining a coding setting of video data that is received from a different communication device in accordance with the subjective quality information and the levels of priority of the items; and a notifying unit that notifies the coding setting information to a different communication device that is a transmission source of the video data.

The present invention also provides a communication system comprising: a first communication device that encodes video data in a scalable manner and transmits encoded video data; a second communication device that receives video data that is transmitted from the first communication device, decodes received video data, and reproduces and outputs decoded video data, wherein the first communication device includes a coding unit that encodes video data that is to be transmitted to the second communication device in accordance with a coding setting that is determined based on coding setting information that is notified by the second communication device, and the second communication device includes a subjective-quality information acquiring unit that acquires subjective quality information in which a combination of values of multiple items related to a coding setting of video data is related to an evaluation result of a subjective quality with respect to video data, a determining unit that determines levels of priority of the items in accordance with at least any one of a purpose of video data that is received from the first communication device and a user's setting operation, a generating unit that generates the coding setting information in accordance with the subjective quality information and the levels of priority, and a notifying unit that notifies the coding setting information to the first communication device.

The present invention also provides a communication control method that is implemented by a communication device that receives, from a different communication device, video data that is encoded in a scalable manner, decodes received video data, and reproduces and outputs decoded video data, the communication control method comprising: acquiring subjective quality information in which a combination of values of multiple items related to a coding setting of video data is related to an evaluation result of a subjective quality with regard to video data; determining levels of priority of the items in accordance with at least any one of a purpose of video data that is received from a different communication device and a user's setting operation; generating coding setting information for determining a coding setting of video data that is received from a different communication device in accordance with the subjective quality information and the levels of priority of the items; and notifying the coding setting information to a different communication device that is a transmission source of the video data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 7A, 7B, and 7C are diagrams that illustrate examples of reception information;

FIG. 8 is a diagram that illustrates an example of subjective quality information;

FIG. 12 is a diagram that illustrates an example of the determined level of priority of each item;

FIG. 13 is a diagram that illustrates an example of coding setting information that is generated in accordance with the levels of priority of FIG. 12;

FIG. 14 is a diagram that illustrates an example of the determined level of priority of each item;

FIG. 15 is a diagram that illustrates an example of coding setting information that is generated in accordance with the levels of priority of FIG. 14; and FIG. 16 is a sequence diagram that illustrates an operation example for transmitting and receiving video data between the terminal at the transmitting end and the terminal at the receiving end.

DETAILED DESCRIPTION OF THE PREFERRED EMBODIMENTS

With reference to the attached drawings, a detailed explanation is given below of an embodiment of a communication device, a communication system, and a communication control method according to the present invention. The following is the description of, as an example of the communication system to which the present invention is applied, a teleconference system (also referred to as a "video-conference system") in which video data and audio data are transmitted and received between multiple teleconference terminals (equivalents of "communication devices") so that a remote conference is conducted at multiple hubs. In this teleconference system, video data is captured, is encoded in a scalable manner, and is transmitted by one teleconference terminal to the different teleconference terminal, and the encoded video data is decoded, reproduced, and output by the different teleconference terminal. However, this is not a limitation of the communication system to which the present invention is applicable. The present invention is widely applicable to various types of communication systems for transmitting and receiving video data that is encoded in a scalable manner between multiple communication devices and to various types of communication terminals that are used in the communication system.

Furthermore, the teleconference system according to the present embodiment may be used for the purposes other than conferences. For example, the teleconference system according to the present embodiment may be used for the purpose of a remote medical care with which a medical personnel conducts a medical practice while checking the video that captures a patient in a remote location. Moreover, the teleconference system according to the present embodiment may be used for the purposes of not only the bidirectional transmission and reception of video data but also the unidirectional video delivery, e.g., delivery of lecture videos of various seminars to audiences. These purposes can be switched by, for example, selecting the application that is executed by the teleconference terminal.

Figure 1:
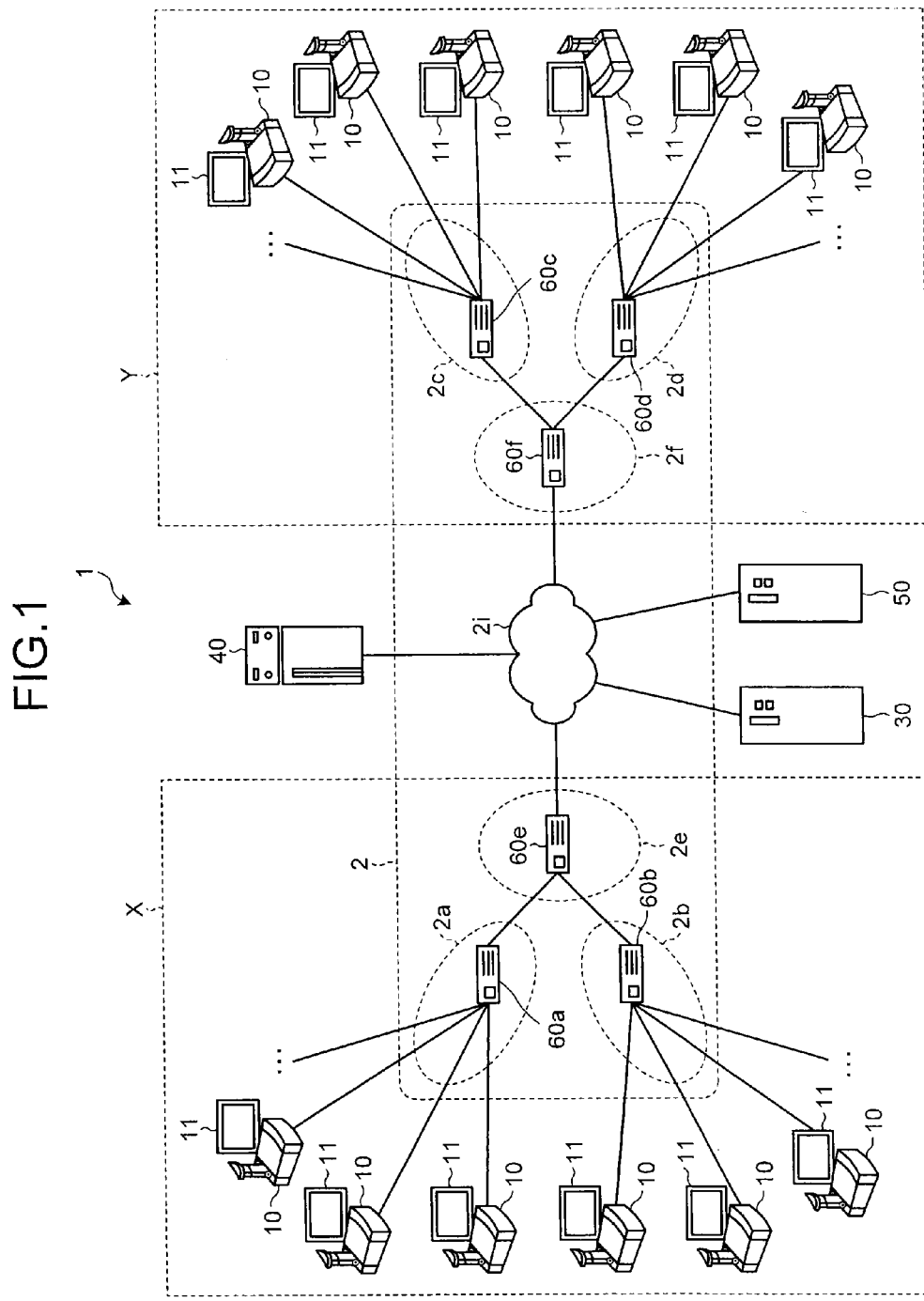
FIG. 1 is a schematic configuration diagram of a teleconference system according to an embodiment of the present invention.

FIG. 1 is a schematic configuration diagram of a teleconference system 1 according to the present embodiment. As illustrated in FIG. 1, the teleconference system 1 according to the present embodiment includes multiple teleconference terminals (simply referred to as the "terminals" below) 10 and displays 11 that are installed at hubs; a relay server 30, a management server 40, and a program providing server 50.

The terminal 10 transmits and receives video data or audio data to and from the different terminal 10 by using the teleconference system 1, and it reproduces, outputs, or the like, the received video data or audio data. The terminal 10 may be a dedicated terminal that is dedicated to the teleconference system 1 or may be a general-use terminal, such as a personal computer (PC), smartphone, or tablet terminal. The above general-use terminals have a terminal-oriented program installed therein as described later, thereby implementing the function of the terminal 10 as one of the applications.

The display 11 is connected to the terminal 10 wired or wirelessly. Furthermore, the display 11 may be configured to be integrated with the terminal 10.

The terminal 10 is connected to, for example, a router within a local area network (LAN). The router is a network device that selects the route for data transmission and, the example depicted in FIG. 1 illustrates a router 60a in a LAN 2a, a router 60b in a LAN 2b, a router 60c in a LAN 2c, a router 60d in a LAN 2d, a router 60e that is connected to the router 60a and the router 60b via a dedicated line 2e and that is connected to an Internet 2i, and a router 60f that is connected to the router 60c and the router 60d via a dedicated line 2f and that is connected to the Internet 2i.

It is assumed that the LAN 2a and the LAN 2b are established in different locations within a region X and the LAN 2c and the LAN 2d are established in different locations within a region Y. For example, the region X is Japan, the region Y is the United States of America, the LAN 2a is established within a business office in Tokyo, the LAN 2b is established within a business office in Osaka, the LAN 2c is established within a business office in New York, and the LAN 2d is established within a business office in Washington, D.C. According to the present embodiment, the LAN 2a, the LAN 2b, the dedicated line 2e, the Internet 2i, the dedicated line 2f, the LAN 2c, and the LAN 2d constitute a communication network 2. The communication network 2 may include an area where a communication is performed not only via a wired line but also wirelessly, such as Wireless Fidelity (Wi-Fi) or Bluetooth (registered trademark).

The relay server 30 is a computer that relays video data or audio data that is transmitted between the terminals 10.

The management server 40 is a computer that manages the overall teleconference system 1 according to the present embodiment. For example, the management server 40 manages the login or the status of each of the terminals 10, manages the status of the relay server 30, manages the sessions between the terminals 10, or the like. As the technology that is described in, for example, Japanese Patent No. 5353989 may be used for the management server 40, its detailed explanations are here omitted.

The program providing server 50 is a computer that provides various programs to the terminal 10, the relay server 30, the management server 40, or the like. For example, the program providing server 50 stores a terminal-oriented program for causing the terminal 10 to implement various functions and can transmit the terminal-oriented program to the terminal 10. Furthermore, the program providing server 50 stores a relay-server oriented program for causing the relay server 30 to implement various functions and can transmit the relay-server oriented program to the relay server 30. Moreover, the program providing server 50 stores a management-server oriented program for causing the management server 40 to implement various functions and can transmit the management-server oriented program to the management server 40.

In the teleconference system 1 according to the present embodiment, video data and audio data are transmitted and received between the terminals 10 via the relay server 30. Here, a management-information session Sei for transmitting and receiving various types of management information is established between the terminals 10 via the management server 40. Furthermore, a data session Sed for transmitting and receiving video data and audio data is established between the terminals 10 via the relay server 30. Here, video data that is transmitted and received during, particularly, the data session Sed is the video data that is encoded by using a scalable coding format, such as the H.264/SVC format. Video data is encoded by using a scalable coding format so that video data with multiple qualities can be transmitted and received at one time. An applicable coding format is not only the H.264/SVC format but also various coding formats for which the layer configuration can be optionally specified.

Video data qualities (reproduction qualities) include, for example, the spatial resolution that is the spatial scalability and the frame rate that is the temporal scalability. Here, the spatial resolution is the screen resolution (also referred to as the screen mode) that is represented by using the number of pixels in a horizontal direction and in a vertical direction of video. As the spatial resolution of video data is increased, the reproduced and displayed video becomes finer and, as the frame rate of video data is increased, the reproduced and displayed video becomes smoother.

With the scalable coding format, the quality of video data that is transmitted and received between the terminals 10 can be controlled in accordance with the coding setting. Furthermore, with the scalable coding format, the error resilience (reliability) of video data can be controlled by selecting the layer configuration in the coding setting. For example, if the number of layers of the spatial resolution is increased, a defect of high-resolution video data can be interpolated by using low-resolution video data; thus the reliability can be improved.

According to the present embodiment, when video data is encoded by the transmitting end that transmits the video data, the coding setting is determined such that the receiving end can obtain the higher subjective quality. Here, according to the conventional technology that is described in Japanese Patent No. 5353989, the coding setting of video data is determined on the basis of the subjective quality that is determined by the transmitting end that transmits the video data; therefore, the coding settings do not reflect the intensions of the receiving end that actually reproduces and outputs the video data. Therefore, according to the present embodiment, the terminal 10 at the receiving end generates the coding setting information for determining the coding setting that conforms to the purpose of video data or a request from a user at the receiving end and notifies it to the terminal 10 at the transmitting end. Then, the terminal 10 at the transmitting end encodes the video data in accordance with the coding setting that is determined on the basis of the coding setting information that is notified by the terminal 10 at the receiving end and transmits it to the terminal 10 at the receiving end. Thus, the coding setting can reflect the intentions of the receiving end that actually reproduces and outputs the video data.

Figure 2:
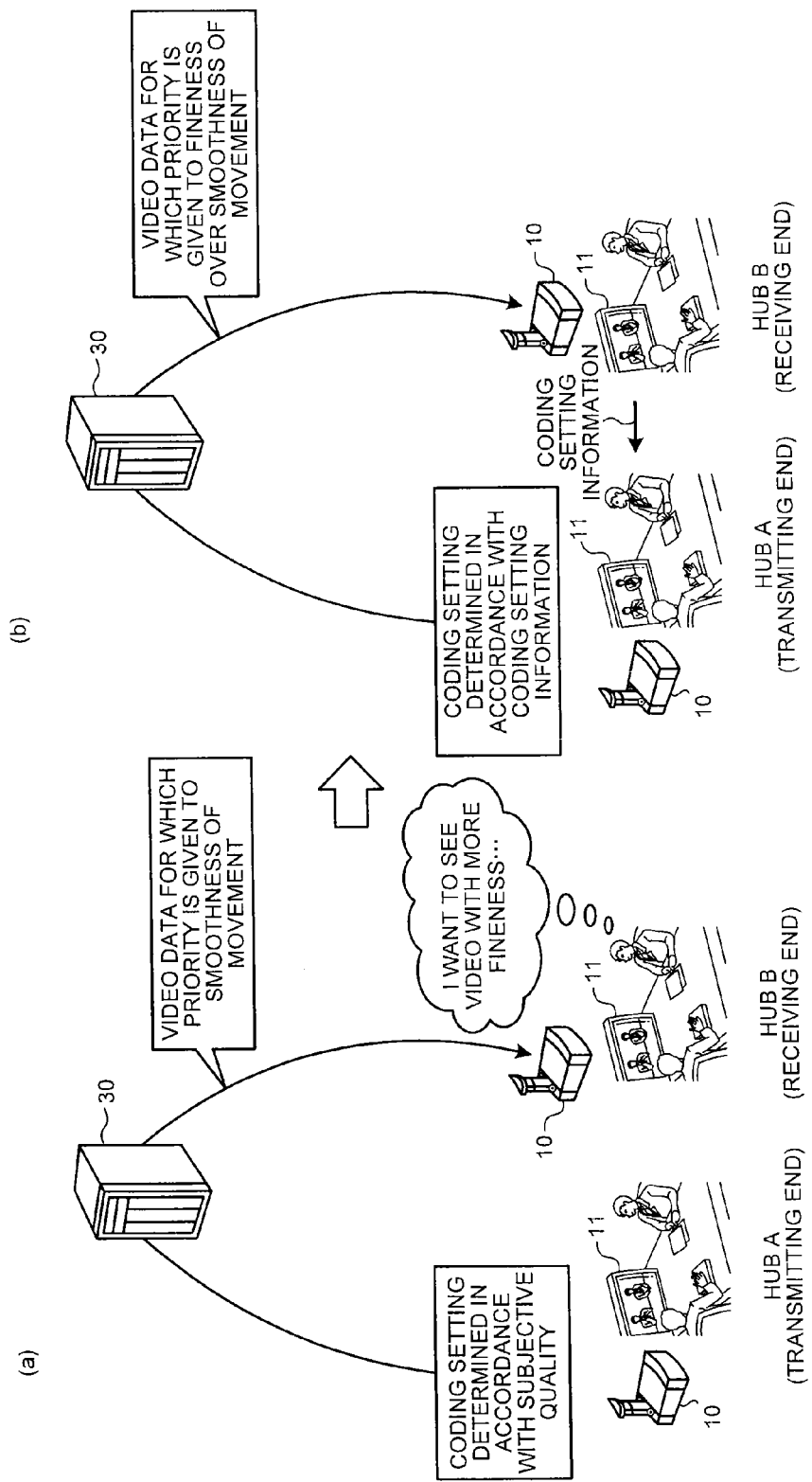
FIG. 2 is a conceptual diagram that schematically illustrates the situation where video data is transmitted by a transmitting end and is reproduced and output by a receiving end.

FIG. 2 is a conceptual diagram that schematically illustrates the situation where video data is transmitted by the transmitting end and is reproduced and output by the receiving end, a portion (a) of FIG. 2 illustrates an example in a case where the conventional technology is applied, and a portion (b) of FIG. 2 illustrates an example according to the present embodiment. In the example of FIG. 2, it is assumed that priority is given to any one of the fineness of video and the smoothness of movement in accordance with the coding setting of the video data.

According to the conventional technology, as illustrated in the portion (a) of FIG. 2, the coding setting of the video data is determined on the basis of the subjective quality that is determined by the terminal 10 at the hub A that is the transmitting end. Therefore, in some cases, although the fineness of the video is required by the hub B that is the receiving end, for example, the video data in which priority is given to the smoothness of movement in accordance with the determined coding setting is transmitted to the terminal 10 at the hub B, which results in frustrations of the user at the hub B.

Conversely, according to the present embodiment, as illustrated in the portion (b) of FIG. 2, the terminal 10 at the hub B that is the receiving end generates the coding setting information for determining the coding setting that conforms to the purpose of the video data or the request from the user and notifies it to the terminal 10 at the hub A that is the transmitting end. Then, the terminal 10 at the hub A determines the coding setting on the basis of the coding setting information that is notified by the terminal 10 at the hub B. Thus, the coding setting can reflect the intentions of the hub B that is the receiving end and, for example, if the fineness of the video is required by the hub B that is the receiving end, the video data in which priority is given to the fineness over the smoothness of movement can be transmitted to the terminal 10 at the hub B for reproduction and output.

Notification of the coding setting information from the terminal 10 at the hub B to the terminal 10 at the hub A may be made via the relay server 30 or via the management server 40. Alternatively, notification of the coding setting information from the terminal 10 at the hub B to the terminal 10 at the hub A may be made directly (without involving the relay server 30 or the management server 40).

The above-described characteristic operation according to the present embodiment may be performed, for example, if the new function to generate and notify the above-described coding setting information, or the like, is added to the terminal 10. A specific configuration example of the terminal 10 that has the above-described function is described in detail later.

Figure 3:
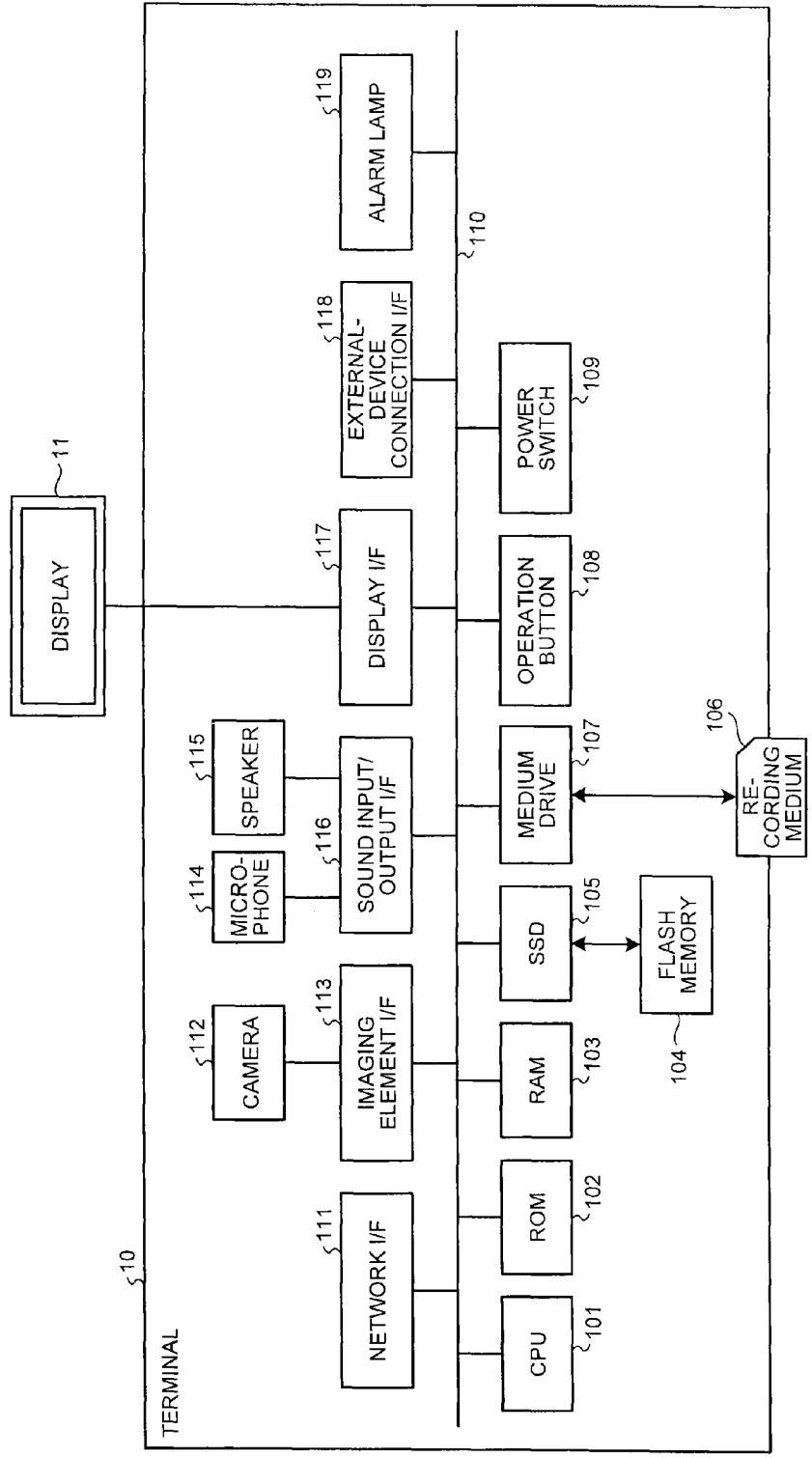
FIG. 3 is a block diagram that illustrates an example of the hardware configuration of a terminal.
Figure 4:
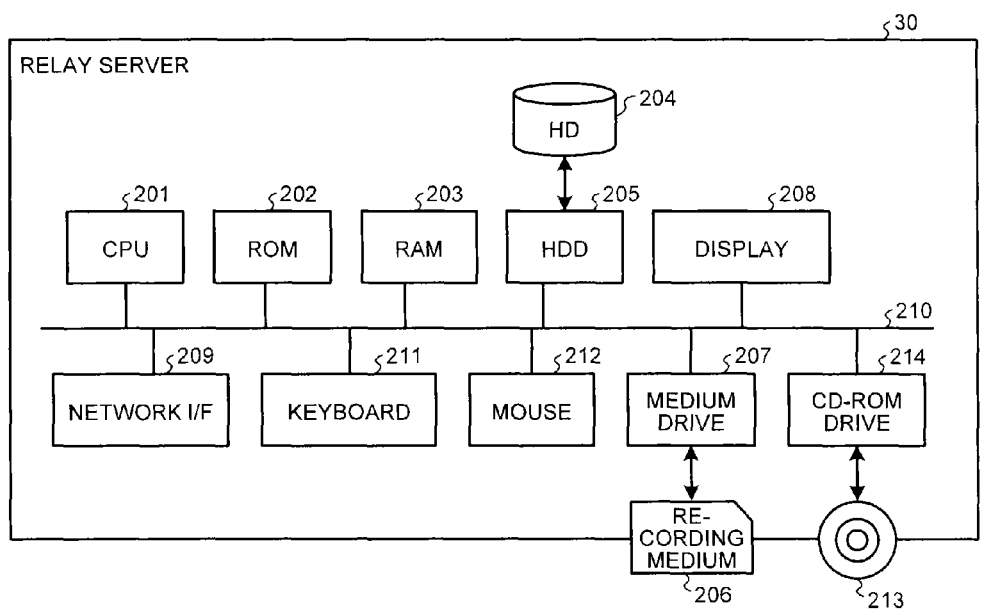
FIG. 4 is a block diagram that illustrates an example of the hardware configuration of a relay server.

Next, an explanation is given of the hardware configuration of the terminal 10, the relay server 30, and the management server 40 in the teleconference system 1 according to the present embodiment. FIG. 3 illustrates an example of the hardware configuration of the terminal 10, and FIG. 4 illustrates an example of the hardware configuration of the relay server 30. As the management server 40 may use the same hardware configuration as that of the relay server 30, its illustration is omitted.

As illustrated in FIG. 3, the terminal 10 includes a central processing unit (CPU) 101 that controls the overall operation of the terminal 10; a read only memory (ROM) 102 that stores a program, such as an initial program loader (IPL), that is used for driving the CPU 101; a random access memory (RAM) 103 that is used as a work area of the CPU 101; a flash memory 104 that stores a terminal-oriented program or various types of data, such as image data or audio data; a solid state drive (SSD) 105 that controls reading or writing of various types of data from or in the flash memory 104 under the control of the CPU 101; a medium drive 107 that controls reading or writing (storing) data from or in a recording medium 106, such as a flash memory; an operation button 108 that is operated, for example, for selecting the different terminal 10 that is the other end of the communication; a power switch 109 for switching on/off the power source of the terminal 10; and a network interface (I/F) 111 for data transmission using the communication network 2.

The terminal 10 further includes a built-in camera 112 that captures an object to acquire the image data under the control of the CPU 101; an imaging element I/F 113 that controls driving of the camera 112; a built-in microphone 114 that inputs sounds; a built-in speaker 115 that outputs sounds; a sound input/output I/F 116 that processes input/output of audio signals between the microphone 114 and the speaker 115 under the control of the CPU 101; a display I/F 117 that transmits image data that is presented on the display 11 under the control of the CPU 101; an external-device connection I/F 118 for connecting various external devices; an alarm lamp 119 that notifies a failure of various functions of the terminal 10; and a bus line 110, such as an address bus or a data bus, for electrically connecting the above-described components.

The camera 112, the microphone 114, and the speaker 115 do not necessarily need to be built in the terminal 10, and they may be configured to be externally connected. Furthermore, the display 11 may be configured to be built in the terminal 10. It is assumed that the display 11 is a display device, such as a liquid crystal panel; however, this is not a limitation, and it may be a projection device, such as a projector. The hardware configuration of the terminal 10 illustrated in FIG. 2 is only an example, and the hardware other than the above-described one may be added.

A terminal-oriented program that is provided by the above-described program providing server 50 is stored in, for example, the flash memory 104 and is loaded into the RAM 103 under the control of the CPU 101 for execution. It is appropriate if the memory that stores a terminal-oriented program is a nonvolatile memory, and not only the flash memory 104 but also an Electrically Erasable Programmable ROM (EEPROM), or the like, may be used. Furthermore, the terminal-oriented program may be provided by being stored, in the form of a file that is installable and executable, in a recording medium readable by a computer, such as the recording medium 106. Moreover, the terminal-oriented program may be provided as an installed program that is previously stored in the ROM 102, or the like.

As illustrated in FIG. 4, the relay server 30 includes a CPU 201 that controls the overall operation of the relay server 30; a ROM 202 that stores a program, such as the IPL, that is used for driving the CPU 201; a RAM 203 that is used as a work area of the CPU 201; a hard disk (HD) 204 that stores various types of data, such as a relay-server oriented program; an HD drive (HDD) 205 that controls reading or writing various types of data from or in the HD 204 under the control of the CPU 201; a medium drive 207 that controls reading or writing (storing) data from or to a recording medium 206, such as a flash memory; a display 208 that presents various types of information; a network I/F 209 for data transmission using the communication network 2; a keyboard 211; a mouse 212; a compact disc read only memory (CD-ROM) drive 214 that controls reading or writing various types of data from or to a CD-ROM 213 that is an example of a removable recording medium; and a bus line 210, such as an address bus or a data bus, for electrically connecting the above-described components.

The relay-server oriented program that is provided by the above-described program providing server 50 is stored in, for example, the HD 204 and is loaded into the RAM 203 under the control of the CPU 201 for execution. Furthermore, the relay-server oriented program may be provided by being stored, in the form of a file that is installable and executable, in a computer-readable recording medium, such as the recording medium 206 or the CD-ROM 213. Moreover, the relay-server oriented program may be provided as an installed program that is previously stored in the ROM 202, or the like.

The management server 40 may use the same hardware configuration as that of the relay server 30 illustrated in FIG. 4. However, the management-server oriented program provided by the program providing server 50 is recorded in the HD 204. In this case, too, the management-server oriented program may be provided by being stored, in the form of a file that is installable and executable, in a computer-readable recording medium, such as the recording medium 206 or the CD-ROM 213. Furthermore, the management-server oriented program may be provided as an installed program that is previously stored in the ROM 202, or the like.

Other examples of the removable recording medium include a recording medium readable by a computer, such as a Compact Disc Recordable (CD-R), digital versatile disk (DVD), or Blu-ray Disc. The above-described various programs may be provided by being recorded in the above recording medium.

Figure 5:
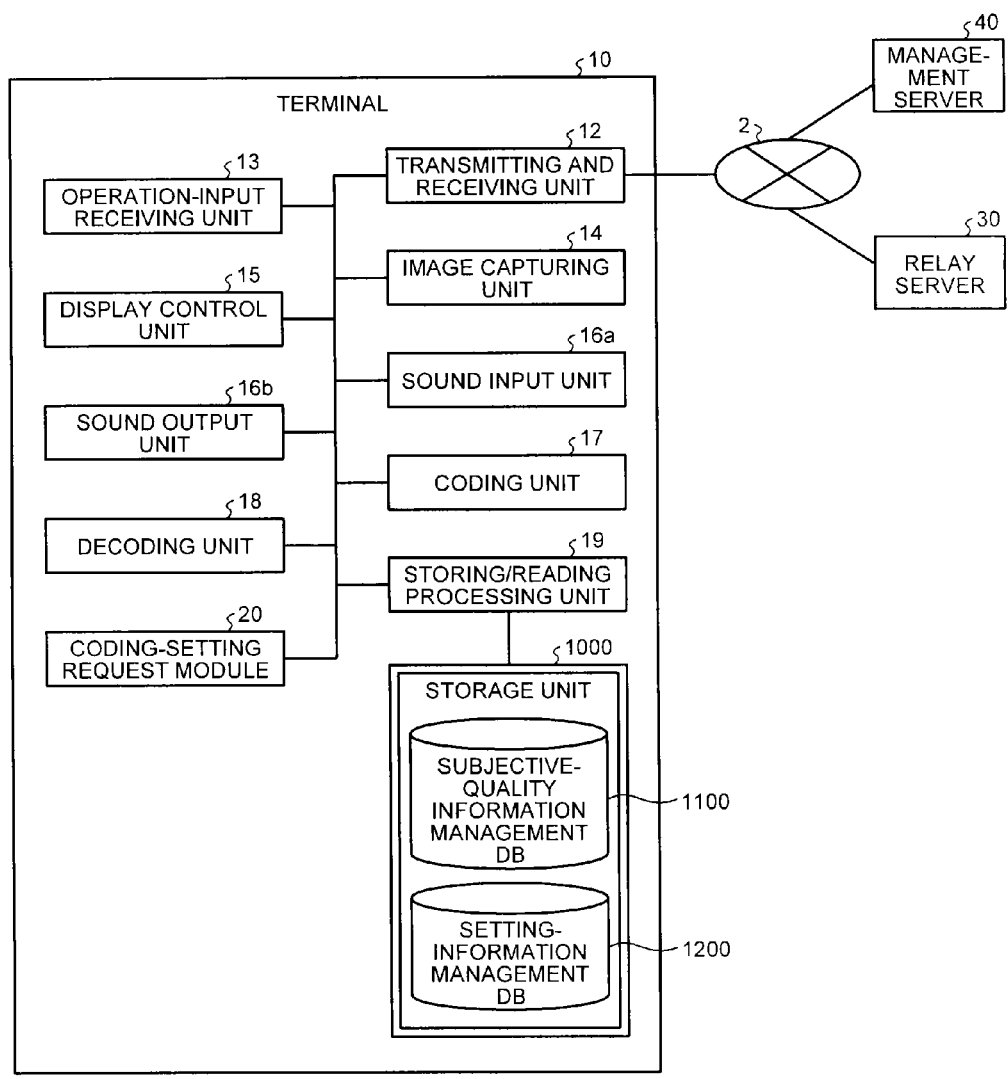
FIG. 5 is a block diagram that illustrates an example of the functional configuration of the terminal.
Figure 6:
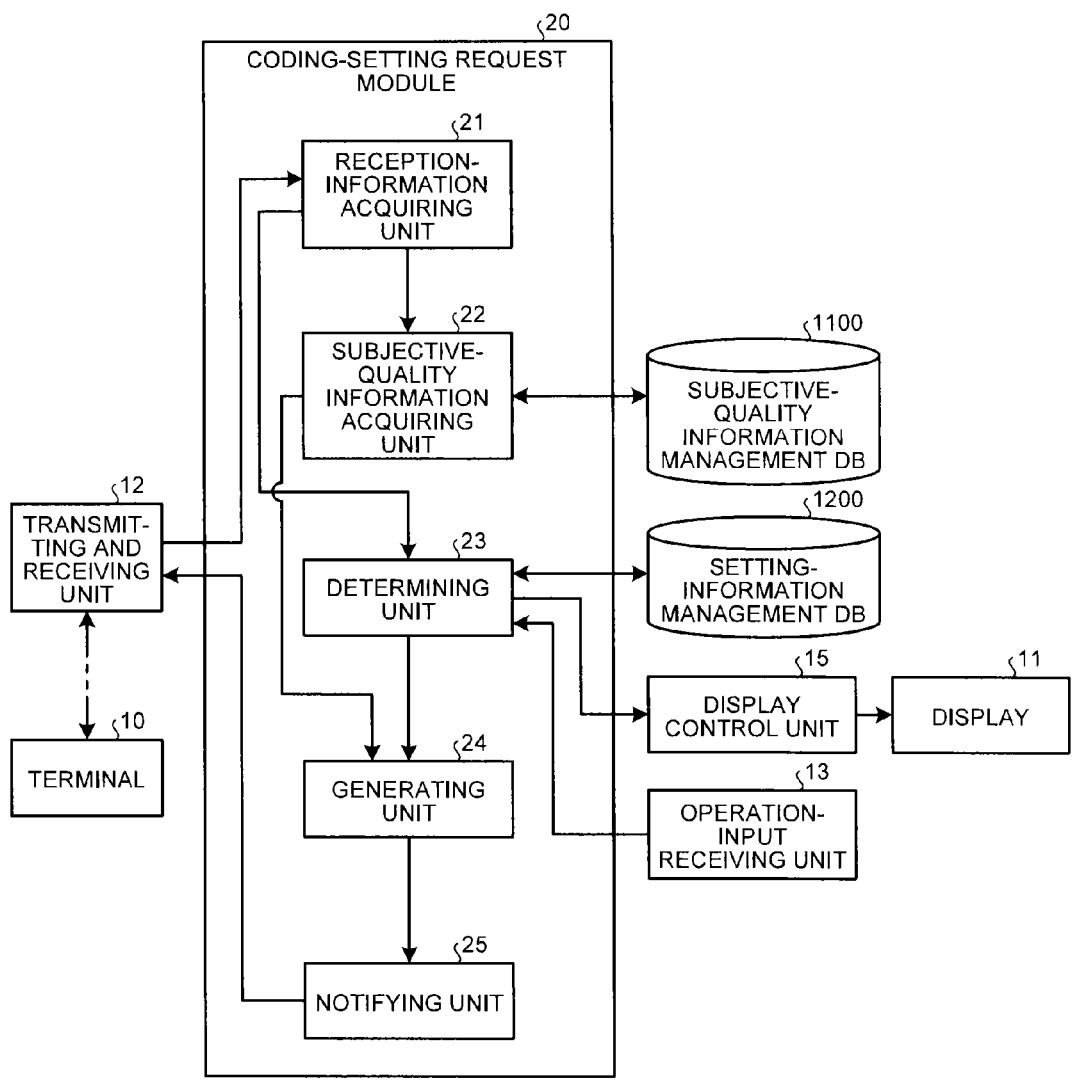
FIG. 6 is a block diagram that illustrates the details of a coding-setting request module that is included in the terminal.

Next, an explanation is given of the functional configuration of the terminal 10. FIG. 5 is a block diagram that illustrates an example of the functional configuration of the terminal 10, and FIG. 6 is a block diagram that illustrates the details of a coding-setting request module 20 that is included in the terminal 10.

As illustrated in FIG. 5, the terminal 10 includes a transmitting and receiving unit 12, an operation-input receiving unit 13, an image capturing unit 14, a display control unit 15, a sound input unit 16a, a sound output unit 16b, a coding unit 17, a decoding unit 18, a storing/reading processing unit 19, a storage unit 1000, and the coding-setting request module 20. These units are the functions that are implemented when the CPU 101 executes the terminal-oriented program that is loaded into the RAM 103 from the flash memory 104 illustrated in FIG. 3, for example. Furthermore, the terminal 10 includes the storage unit 1000 that is constituted by the RAM 103 and the flash memory 104 that are illustrated in FIG. 3, for example.

In the storage unit 1000 are established a subjective-quality information management DB 1100 that manages subjective quality information that is described later and a setting-information management DB 1200 that manages the setting information that is described later. Furthermore, the storage unit 1000 is also used as a receiving buffer for video data and audio data that are received from the different terminal 10.

The transmitting and receiving unit 12 transmits and receives various types of data or various types of information to and from the different terminal 10, the relay server 30, the management server 40, or the like, via the communication network 2. Furthermore, according to the present embodiment, the transmitting and receiving unit 12 has the function to transmit, to the terminal 10 at the receiving end, the reception information that is described later and that includes information, such as the purpose of the video data according to the application or the estimated transmission bit rate, as advance information before starting to transmit the video data to the different terminal 10. The transmitting and receiving unit 12 is implemented by the network I/F 111 and the CPU 101 that are illustrated in FIG. 3, for example.

The operation-input receiving unit 13 receives various operation inputs by the user who uses the terminal 10. The operation-input receiving unit 13 is implemented by the operation button 108, the power switch 109, and the CPU 101 that are illustrated in FIG. 3, for example.

The image capturing unit 14 captures video at the hub where the terminal 10 is installed and outputs video data. The image capturing unit 14 is implemented by the camera 112, the imaging element I/F 113, and the CPU 101 that are illustrated in FIG. 3, for example.

The display control unit 15 performs a control so as to cause the display 11 to present (reproduce and output) video on the basis of the video data that is received by the transmitting and receiving unit 12 from the different terminal 10 and that is decoded by the decoding unit 18. Furthermore, the display control unit 15 performs a control so as to cause the display 11 to present the screen for changing the priority level setting, the screen for manually setting the level of priority, or the like, which are described later, in response to a request from the coding-setting request module 20. The display control unit 15 is implemented by the display I/F 117 and the CPU 101 that are illustrated in FIG. 3, for example.

The sound input unit 16a receives sounds at the hub where the terminal 10 is installed and outputs audio data. The sound input unit 16a is implemented by the microphone 114, the sound input/output I/F 116, and the CPU 101 that are illustrated in FIG. 3, for example.

The sound output unit 16b reproduces and outputs audio data. The sound output unit 16b is implemented by the speaker 115, the sound input/output I/F 116, and the CPU 101 that are illustrated in FIG. 3, for example.

The coding unit 17 encodes video data that is output from the image capturing unit 14 or audio data that is output from the sound input unit 16a. Particularly, with regard to encoding of video data, the coding unit 17 encodes video data in accordance with a scalable coding format, such as H.264/SVC. Furthermore, the coding unit 17 has the function to determine the coding setting for encoding video data in a scalable manner on the basis of the coding setting information that is notified by the terminal 10 at the transmission destination (the receiving end) of the video data. The coding unit 17 is implemented when the CPU 101, which is illustrated in FIG. 3, for example, executes a coding/decoding program (video/sound codec) that is included in the above-described terminal-oriented program.

The decoding unit 18 decodes video data or audio data that is transmitted from the different terminal 10 via the relay server 30 and outputs pre-coding video data or audio data. The decoding unit 18 is implemented when the CPU 101, which is illustrated in FIG. 3, for example, executes a coding/decoding program (video/sound codec) included in the above-described terminal-oriented program.

The storing/reading processing unit 19 performs an operation to store or read various types of data in or from the storage unit 1000. The storing/reading processing unit 19 is implemented by the SSD 105 and the CPU 101 that are illustrated in FIG. 3, for example.

The coding-setting request module 20 is the module that performs an operation characteristic of the terminal 10 according to the present embodiment, and it is implemented when the CPU 101, which is illustrated in FIG. 3, for example, executes the coding-setting request program included in the above-described terminal-oriented program. As illustrated in FIG. 6, the coding-setting request module 20 includes a reception-information acquiring unit 21, a subjective-quality information acquiring unit 22, a determining unit 23, a generating unit 24, and a notifying unit 25.

The reception-information acquiring unit 21 acquires the reception information from the different terminal 10, which is the transmission source of the video data, via the transmitting and receiving unit 12. The reception information indicates the type of video data that is subsequently received, i.e., the video data that is encoded and transmitted by the terminal 10 at the transmitting end.

FIGS. 7A, 7B, and 7C are diagrams that illustrate examples of the reception information. The reception information illustrated in FIGS. 7A, 7B, and 7C contains various types of information with regard to the video data to be received, such as the purpose, the estimated transmission bit rate, the spatial resolution, and the frame rate. The purpose is the information that indicates the purpose (application) for which the video data is used. The estimated transmission bit rate is the information that indicates the bit rate during the transmission of the video data and that is estimated in accordance with, for example, the status of the communication network 2. The spatial resolution is the information that indicates the maximum spatial resolution (the spatial resolution with the maximum quality for coding in a scalable manner) of the video data to be transmitted. The frame rate is the information that indicates the maximum frame rate (the frame rate with the maximum quality for coding in a scalable manner) of the video data to be transmitted.

For example, the reception information illustrated in FIG. 7A indicates that the video data is used for the purpose of a conference and it is transmitted with the spatial resolution of 1280×720 (the number of pixels in horizontal×vertical) and the frame rate of 30 fps at a maximum and with the bit rate of 1000 Kbps. Furthermore, the reception information illustrated in FIG. 7B indicates that the video data is used for the purpose of a remote medical care and it is transmitted with the spatial resolution of 640×360 and the frame rate of 30 fps at a maximum and with the bit rate of 2000 Kbps. Furthermore, the reception information illustrated in FIG. 7C indicates that the video data is used for the purpose of video delivery and it is transmitted with the spatial resolution of 800×450 and the frame rate of 60 fps at a maximum and with the bit rate of 500 Kbps.

Before receiving the video data from the different terminal 10, the reception-information acquiring unit 21 acquires the reception information illustrated in FIGS. 7A, 7B, and 7C as the advance information from the different terminal 10 that is the transmission source of the video data and delivers the acquired reception information to the subjective-quality information acquiring unit 22 and the determining unit 23. The structure of the reception information illustrated in FIGS. 7A, 7B, and 7C is an example, and this is not a limitation. For example, a configuration may be such that the above-described purpose is not included in the reception information and the purpose of the video data is recognized in accordance with the selection of an application, such as a conference app, telemedicine app, or video delivery app, by the terminal 10.

The subjective-quality information acquiring unit 22 acquires, from the subjective-quality information management DB 1100 that is established in the storage unit 1000, the subjective quality information that matches the reception information that is acquired by the reception-information acquiring unit 21. The subjective quality information is the information in which the combination of values of multiple items with respect to the coding setting of video data is related to the evaluation result of the subjective quality with regard to the video data, and it is generated by previously performing subjective-quality evaluation experiments. According to the present embodiment, the spatial resolution and the frame rate, which are related to the reproduction quality of video data, and the spatial-resolution layer number, which is related to the error resilience (reliability) of video data, are treated as multiple items with regard to the coding setting of video data. There is a high possibility that, if a defect of video data occurs on the communication network 2, the defective portion is interpolated by using the information on the expansion layer so that the video data can be restored; therefore, here, as the number of layers of the spatial resolution is increased, the error resilience becomes higher.

FIG. 8 is a diagram that illustrates an example of the subjective quality information. The subjective quality information of FIG. 8 indicates the results of subjective-quality evaluation experiments that are conducted by changing the values of the items, such as the spatial resolution, the frame rate, and the spatial-resolution layer number, with regard to the target bit rate, and the combinations of values of the items are sequentially arranged in descending order of the evaluation results. FIG. 8 illustrates only the part of the subjective quality information in a case where the target bit rate is 1000 Kbps; however, the same number of pieces of subjective quality information as the combinations of values of the items for which the subjective quality is evaluated are actually generated with regard to each of the target bit rates, and they are stored in the subjective-quality information management DB 1100. The subjective-quality evaluation experiment can be conducted by using, for example, an evaluation means (http://www.itu.int/ITU-T/recommendations/index.aspx?ser=P) that is recommended by the ITU-T (principally, P. 900 by series).

The subjective-quality information acquiring unit 22 acquires only the necessary information from the subjective quality information that is stored in the subjective-quality information management DB 1100 on the basis of the reception information that is acquired by the reception-information acquiring unit 21. For example, the subjective-quality information acquiring unit 22 extracts, from the subjective quality information that is stored in the subjective-quality information management DB 1100, the subjective quality information for which the target bit rate is the same as the estimated transmission bit rate included in the reception information. Furthermore, the subjective-quality information acquiring unit 22 extracts, from the above, the subjective quality information that contains the value that is equal to or less than the maximum spatial resolution included in the reception information as the value of the item of the spatial resolution and that contains the value equal to or less than the maximum frame rate included in the reception information as the value of the item of the frame rate. Then, the subjective-quality information acquiring unit 22 delivers the extracted subjective quality information to the generating unit 24.

According to the present embodiment, the subjective-quality information management DB 1100 is established in the storage unit 1000 of the terminal 10, and the subjective-quality information acquiring unit 22 acquires, from the subjective-quality information management DB 1100, the subjective quality information that matches the reception information; however, this is not a limitation. A configuration may be such that, for example, the subjective-quality information acquiring unit 22 acquires the subjective quality information that matches the reception information from outside of the terminal 10. Thus, the capacity of the storage unit 1000 can be reduced.

Furthermore, according to the present embodiment, it is assumed that the subjective quality information is generated by averaging the evaluation results of subjective-quality evaluation experiments that are subjected to a large number of examinees; however, this is not a limitation. For example, a configuration may be such that the subjective-quality evaluation experiment is conducted for the user who uses the terminal 10 and the subjective quality information is generated by using the evaluation result and is stored in the subjective-quality information management DB 1100. In this case, the coding setting information that is generated by the generating unit 24, which is described later, can further reflect the characteristics of the user who uses the terminal 10.

The determining unit 23 determines the levels of priority of multiple items related to the coding setting of the video data on the basis of at least any one of the purpose included in the reception information that is acquired by the reception-information acquiring unit 21 and the user's setting operation that is received by the operation-input receiving unit 13. According to the present embodiment, it determines the levels of priority of the spatial resolution and the frame rate, which are the items related to the reproduction quality of the video data, and the level of priority of the spatial-resolution layer number, which is the item related to the error resilience (reliability) of the video data. Specifically, the determining unit 23 determines whether, among these items, priority is given to the item related to the reproduction quality of the video data or the item related to the error resilience. Furthermore, the determining unit 23 determines whether, between the spatial resolution and the frame rate that are related to the reproduction quality of the video data, priority is given to the spatial resolution or the frame rate.

For example, the determining unit 23 can determine the level of priority of each of the above-described items in accordance with the setting information that corresponds to the purpose included in the reception information acquired by the reception-information acquiring unit 21 and that is included in the setting information managed in the setting-information management DB 1200 that is established in the storage unit 1000. The setting information is the information that indicates each item's level of priority that is previously defined with respect to each purpose of video data.

Figure 9:
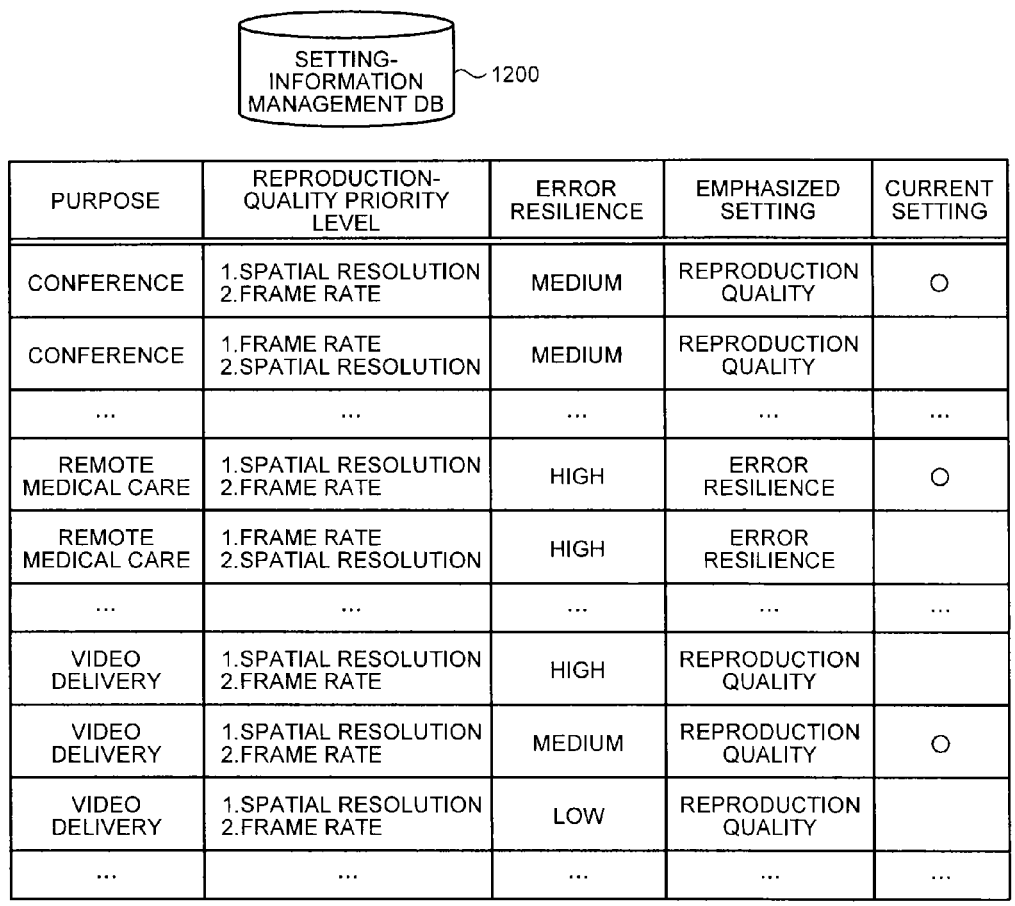
FIG. 9 is a diagram that illustrates an example of the setting information.

FIG. 9 is a diagram that illustrates an example of the setting information. The setting information of FIG. 9 defines, with regard to each purpose of video data, which one of the spatial resolution and the frame rate, which are the items related to the reproduction quality, is given priority, which level of error resilience (spatial-resolution layer number) is required, and which one of the reproduction quality and the error resilience is more emphasized. Even if the purpose is the same, the level of priority of each item is different depending on the request (purpose) of the receiving end; therefore, multiple pieces of setting information are prepared for the same purpose, and there is an indication of which one of them is the currently selected setting information (the current setting).

To determine the level of priority of each item, if no user's setting operation is received, the determining unit 23 determines the level of priority of each item in accordance with the setting information that is selected as the current setting and that is included in the setting information that corresponds to the purpose included in the reception information that is acquired by the reception-information acquiring unit 21. Furthermore, if a user's setting operation is received by the operation-input receiving unit 13, the determining unit 23 determines the level of priority of each item on the basis of the setting information that is selected in accordance with the user's setting operation.

Figure 10A:
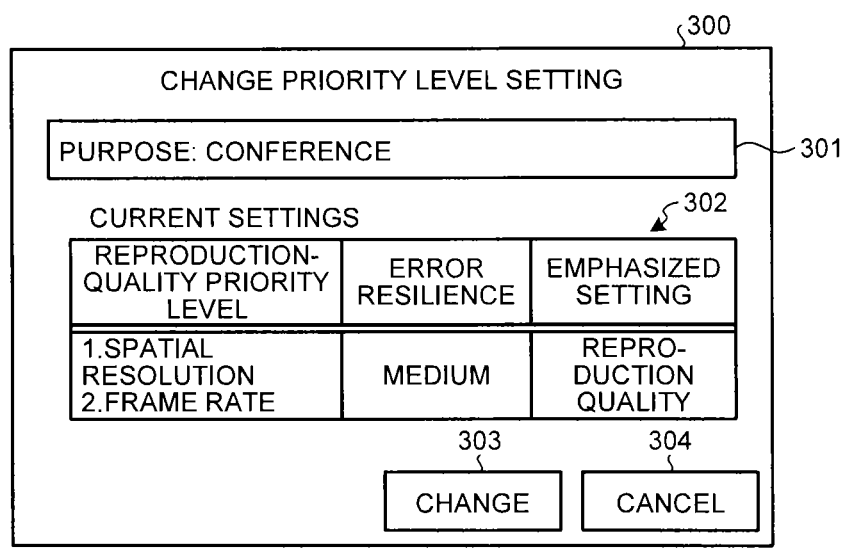
FIGS. 10A and 10B are diagrams that illustrate examples of a screen for changing the priority level setting.
Figure 10B:
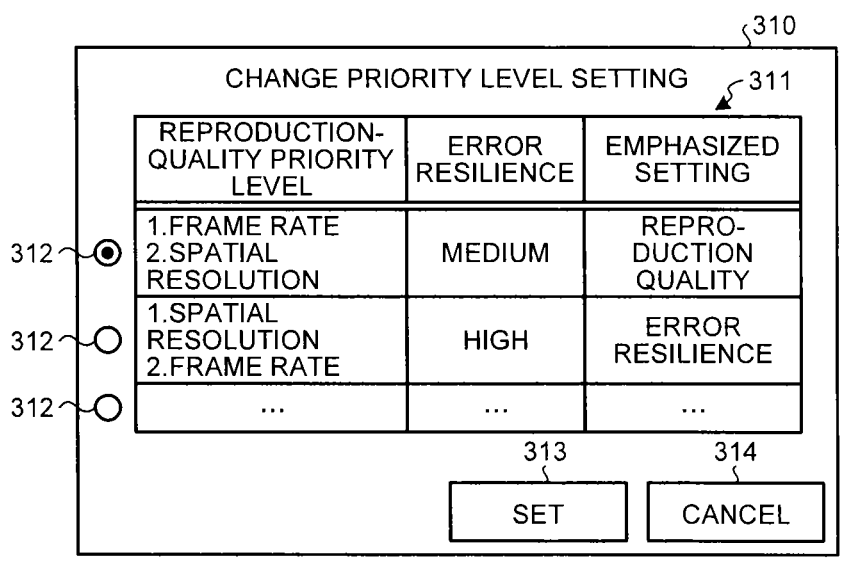

FIGS. 10A and 10B are diagrams that illustrate examples of the screen for changing the priority level setting to select the setting information by a user. The screen for changing the priority level setting is presented on the display 11 under the control of the display control unit 15 when a predetermined user's operation is received by the operation-input receiving unit 13.

When a predetermined operation is performed by a user, the display 11 of the terminal 10 first presents a UI screen 300 illustrated in FIG. 10A as the screen for changing the priority level setting. A text box 301 within the UI screen 300 presents the purpose of the video data to be received (the purpose included in the reception information that is acquired by the reception-information acquiring unit 21). Furthermore, a display area 302 presents the setting information that is included in the pieces of setting information that corresponds to the purpose and that is selected as the current setting. When the user checks the display of the UI screen 300 and operates a "change" button 303 within the UI screen 300, the presentation of the display 11 transitions to a UI screen 310 illustrated in FIG. 10B. If a user operates a "cancel" button 304 within the UI screen 300, the setting operation is canceled.

A display area 311 within the UI screen 310 presents, together with check boxes 312, the list of pieces of setting information other than the setting information that is included in the pieces of setting information that corresponds to the purpose of the video data to be received and that is selected as the current setting. If a user sees the list, checks any one of the check boxes 312, and operates a "set" button 313 within the UI screen 310, the checked setting information is newly selected as the current setting. Then, the determining unit 23 determines the level of priority of each item in accordance with the selected setting information. If a user operates a "cancel" button 314 within the UI screen 310, the setting operate is cancelled.

Furthermore, the determining unit 23 may determine the level of priority of each of the above-described items in accordance with only the user's setting operation that is received by the operation-input receiving unit 13. For example, it is possible that the setting screen for manually setting the level of priority of each item by a user is presented on the display 11 and the level of priority of each item is determined in accordance with the settings on the setting screen.

Figure 11A:
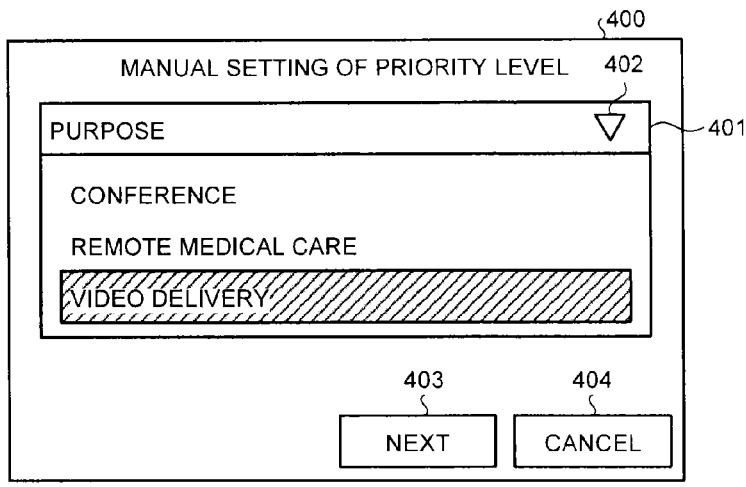
FIGS. 11A, 11B, and 11C are diagrams that illustrate examples of a manual setting screen for the level of priority.
Figure 11B:
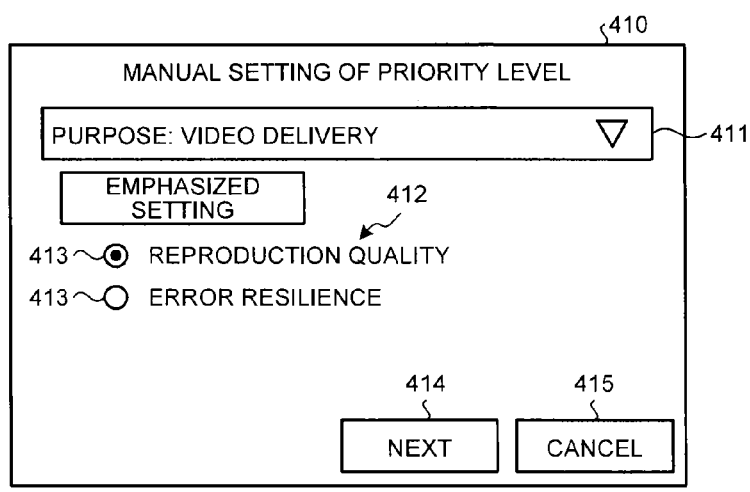
Figure 11C:
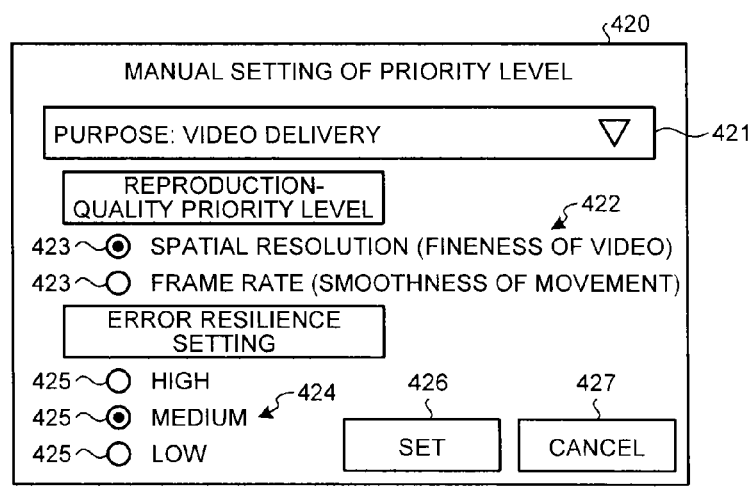

FIGS. 11A, 11B, and 11C are diagrams that illustrate examples of the manual setting screen for the level of priority. The manual setting screen of the level of priority is displayed on the display 11 under the control of the display control unit 15 when a predetermined user's operation is received by the operation-input receiving unit 13.

When a predetermined operation is performed by a user, the display 11 of the terminal 10 first presents a UI screen 400 as illustrated in FIG. 11A as the manual setting screen of the level of priority. A pull-down button 402 is provided in a text box 401 within the UI screen 400, and the list of purposes is displayed in accordance with a user's operation on the pull-down button 402. Then, when a user selects the desired purpose from the list and operates a "next" button 403 within the UI screen 400, the presentation of the display 11 transitions to a UI screen 410 illustrated in FIG. 11B. Furthermore, when a user operates a "cancel" button 404 within the UI screen 400, the setting operation is canceled.

A text box 411 within the UI screen 410 displays the purpose that is selected by the user. Furthermore, a display area 412 presents, together with check boxes 413, the options of the settings on which emphasis is placed. When the user sees the presentation of the UI screen 410, checks any one of the check boxes 413 that correspond to options in the display area 412, and operates a "next" button 414 within the UI screen 410, the checked option is selected as the setting on which emphasis is placed, and the presentation of the display 11 transitions to a UI screen 420 illustrated in FIG. 11C. Furthermore, when a user operates a "cancel" button 415 within the UI screen 410, the setting operation is canceled.

A text box 421 within the UI screen 420 presents the purpose that is selected by the user. Furthermore, a display area 422 presents, together with check boxes 423, the options of the reproduction-quality priority level to be set. Moreover, a display area 424 presents, together with check boxes 425, the options of the error resilience to be set. Then, when the user checks any one of the check boxes 423 that correspond to the options in the display area 422 and any one of the check boxes 425 that correspond to the options in the display area 424 and operates a "set" button 426 within the UI screen 420, the emphasized setting, which is selected on the UI screen 410, and the options of the reproduction-quality priority level and the error resilience, which are checked on the UI screen 420, are determined as the manual settings. Then, the determining unit 23 determines the level of priority of each item in accordance with the determined manual settings. Furthermore, when a user operates a "cancel" button 427 within the UI screen 420, the setting operation is canceled.

The determining unit 23 determines the levels of priority of multiple items related to the coding setting of the video data by using any of the above-described methods on the basis of the presence or absence of a user's setting operation and delivers the determined level of priority of each item to the generating unit 24. The above-described method of determining the level of priority is an example, and this is not a limitation. It is appropriate if the determining unit 23 can determine the levels of priority of multiple items related to the coding setting of the video data by reflecting the intentions of the receiving end that receives the video data.

The generating unit 24 generates the coding setting information for determining the coding setting of the video data that is received from the terminal 10 at the transmitting end on the basis of the subjective quality information that is acquired by the subjective-quality information acquiring unit 22 and the level of priority of each item that is determined by the determining unit 23. For example, the generating unit 24 rearranges the pieces of subjective quality information (the pieces of subjective quality information that are arranged in descending order of the evaluation results of the subjective quality) that are acquired by the subjective-quality information acquiring unit 22 in accordance with the level of priority of each item that is determined by the determining unit 23, thereby generating the coding setting information.

Specifically, in the example where the level of priority of each item that is determined by the determining unit 23 is as illustrated in, for example, FIG. 12 (here, the level of priority of each item is represented by using the format of the above-described setting information), as the reproduction quality is the setting on which emphasis is placed, priority is given to the spatial resolution and the frame rate, which are related to the reproduction quality, over the spatial-resolution layer number, which is related to the error resilience. Furthermore, with respect to the reproduction-quality priority level, the spatial resolution is higher than the frame rate; therefore, priority is given to the spatial resolution among the items related to the reproduction quality. As a result, the coding setting information is generated as illustrated in, for example, FIG. 13 by rearranging the pieces of subjective quality information that are acquired by the subjective-quality information acquiring unit 22.

Furthermore, in the example where the level of priority of each item that is determined by the determining unit 23 is as illustrated in, for example, FIG. 14 (here, the level of priority of each item is represented by using the format of the above-described setting information), as the error resilience is the setting on which emphasis is placed, priority is given to the spatial-resolution layer number, which is related to the error resilience, over the spatial resolution and the frame rate, which are related to the reproduction quality. Furthermore, with respect to the reproduction-quality priority level, the spatial resolution is higher than the frame rate; therefore, priority is given to the spatial resolution among the items related to the reproduction quality. As a result, the coding setting information is generated as illustrated in, for example, FIG. 15 by rearranging the pieces of subjective quality information that are acquired by the subjective-quality information acquiring unit 22.

The generating unit 24 delivers the coding setting information, which is generated by rearranging the pieces of subjective quality information as described above, to the notifying unit 25. According to the present embodiment, the coding setting information is multiple pieces of subjective quality information that are rearranged in accordance with the level of priority of items in consideration of the loads, or the like, of actual coding of video data by the terminal 10 at the transmitting end that transmits the video data. Furthermore, the terminal 10 at the transmitting end selects subjective quality information in the upper level with priority so as to determine the coding setting. However, this is not a limitation and, for example, the subjective quality information in the top may be selected from multiple pieces of subjective quality information that are rearranged in accordance with the level of priority of items and it may be determined to be the coding setting information.

The notifying unit 25 notifies the coding setting information, which is generated by the generating unit 24, to the terminal 10 that is the transmission source of the video data and that is at the transmitting end via the transmitting and receiving unit 12. Thus, the terminal 10 at the transmitting end determines the coding setting in accordance with the received coding setting information and transmits the video data that is encoded in accordance with the determined coding setting to the terminal 10 at the receiving end. Furthermore, notification of the coding setting information from the terminal 10 at the receiving end to the terminal 10 at the transmitting end may be made via the relay server 30 or via the management server 40. Moreover, notification of the coding setting information from the terminal 10 at the receiving end to the terminal 10 at the transmitting end may be made directly without involving the relay server 30 or the management server 40.

Next, an explanation is given, with reference to FIG. 16, of the outline of the operation characteristic of the teleconference system 1 according to the present embodiment. FIG. 16 is a sequence diagram that illustrates an operation example for transmitting and receiving video data between the terminal 10 at the transmitting end and the terminal 10 at the receiving end.

First, the terminal 10 at the transmitting end performs an operation to notify the reception information (Step S101). The reception information from the terminal 10 at the transmitting end is notified to the terminal 10 at the receiving end via, for example, the relay server 30 (Steps S102-1, S102-2).

In the terminal 10 at the receiving end, the reception-information acquiring unit 21 of the coding-setting request module 20 first acquires the reception information that is notified by the terminal 10 at the transmitting end (Step S103).

Next, the subjective-quality information acquiring unit 22 acquires, from the subjective-quality information management DB 1100 that is established in the storage unit 1000, the subjective quality information that matches the reception information that is acquired at Step S103 (Step S104). Furthermore, the determining unit 23 determines the level of priority in accordance with the purpose of the video data with regard to each item related to the coding setting that is treated in the subjective quality information (Step S105).

Next, the generating unit 24 uses the subjective quality information that is acquired at Step S104 and the level of priority of each item that is determined at Step S105 to generate the coding setting information with which the terminal 10 at the transmitting end determines the coding setting (Step S106). Then, the notifying unit 25 performs an operation to notify the coding setting information that is generated at Step S106 (Step S107). The coding setting information from the terminal 10 at the receiving end is notified to the terminal 10 at the transmitting end via, for example, the relay server 30 (Steps S108-1, S108-2).

Next, in the terminal 10 at the transmitting end, the coding unit 17 determines the coding setting of the video data on the basis of the coding setting information that is notified by the terminal 10 at the receiving end (Step S109) and encodes the video data in accordance with the determined coding setting (Step S110). The video data that is encoded by the terminal 10 at the transmitting end is transmitted to the terminal 10 at the receiving end via the relay server 30 (Steps S111-1, S111-2).

In the terminal 10 at the receiving end, the decoding unit 18 decodes the video data that is transmitted by the terminal 10 at the transmitting end (Step S112), and the display control unit 15 reproduces and outputs the decoded video data and causes the display 11 to present the video (Step S113). Thus, it is possible to make the display 11 present the video with a higher subjective quality by reflecting the intentions of the receiving end.

As described above in detail by using the specific example, in the teleconference system 1 according to the present embodiment, the terminal 10 at the receiving end acquires the subjective quality information that matches the received video data and determines the level of priority in accordance with at least any one of the purpose of the video data and the user's setting operation with regard to each item included in the subjective quality information. Then, the terminal 10 at the receiving end generates the coding setting information for determining the coding setting of the video data on the basis of the acquired subjective quality information and the level of priority of each item and notifies it to the terminal 10 at the transmitting end. Furthermore, the terminal 10 at the transmitting end determines the coding setting on the basis of the coding setting information that is notified by the terminal 10 at the receiving end and transmits the video data that is encoded in accordance with the coding setting. Therefore, with the teleconference system 1 according to the present embodiment, the coding setting can reflect the intentions of the receiving end that actually reproduces and outputs the video data; thus, it is possible to encode and transmit the video data in accordance with the intentions of the receiving end and reproduce and output the optimum video for the receiving end.

The present invention is not limited to the above-described embodiment, and various modifications or changes may be made for implementations without departing from the scope at the implementation stage. Specifically, the specific configurations and operations of the teleconference system 1 and the terminal 10 that are explained in the above-described embodiment are only examples, and various modifications may be made in accordance with the purpose or intensions.

For example, the relay server 30, the management server 40, and the program providing server 50 in the above-described embodiment may be configured by using a single computer or may be configured by using multiple computers to which the divided functions of each server are arbitrarily assigned. Furthermore, some or all of the functions of each server may be arbitrarily combined so that a server device or a system that has the different framework from that in the above-described embodiment is configured. For example, the functionality of the relay server 30 and the functionality of the management server 40 may be integrated so that a single server device is configured.

Furthermore, according to the above-described embodiment, video data is encoded in a scalable manner and is transmitted and received between the terminals 10; however, audio data as well as video data may be encoded in a scalable manner and transmitted and received between the terminals 10. In this case, the qualities of audio data include, for example, the sampling frequency of sound or the bit length of sound.

Furthermore, in the above-described embodiment, the teleconference system 1 is illustrated as an example of the communication system to which the present invention is applied; however, this is not a limitation. The present invention can be effectively applied to various communication systems, such as a phone system of an Internet Protocol (IP) telephone, or the like, for bi-directionally transmitting and receiving audio data between terminals, a car navigation system for delivering map data, route information, or the like, to a car navigation device that is installed in a vehicle from a terminal of a management center.

Moreover, in the above-described embodiment, the teleconference terminal (terminal) 10 is illustrated as an example of the communication device to which the present invention is applied; however, this is not a limitation. The present invention can be effectively applied to various communication devices, such as PCs, tablet terminals, smartphones, electronic blackboards, or car navigation devices that are installed in vehicles.

The above-described embodiment may be determined as described below. Specifically, the terminal 10 according to the embodiment receives, from the different terminal 10, video data that is encoded in a scalable manner, decodes the received video data, and reproduces and outputs the decoded video data, and the terminal 10 includes the subjective-quality information acquiring unit 22 that acquires subjective quality information in which the combination of values of multiple items related to the coding setting of video data is related to the evaluation result of the subjective quality with regard to the video data; the determining unit 23 that determines levels of priority of the items in accordance with at least any one of the purpose of video data that is received from the different terminal 10 and a user's setting operation; the generating unit 24 that generates coding setting information for determining the coding setting of video data that is received from the different terminal 10 in accordance with the subjective quality information and the levels of priority of the items; and the notifying unit 25 that notifies the coding setting information to the different terminal 10 that is the transmission source of the video data.

Furthermore, the teleconference system 1 according to the present embodiment includes the terminal 10 at the transmitting end that encodes video data in a scalable manner and transmits the encoded video data; and the terminal 10 at the receiving end that receives video data that is transmitted from the terminal 10 at the transmitting end, decodes the received video data, and reproduces and outputs the decoded video data, the terminal 10 at the transmitting end includes the coding unit 17 that encodes video data that is to be transmitted to the terminal 10 at the receiving end in accordance with the coding setting that is determined based on the coding setting information that is notified by the terminal 10 at the receiving end, and the terminal 10 at the receiving end includes the subjective-quality information acquiring unit 22 that acquires subjective quality information in which the combination of values of multiple items related to the coding setting of video data is related to the evaluation result of the subjective quality with respect to video data; the determining unit 23 that determines the levels of priority of the items in accordance with at least any one of the purpose of video data that is received from the terminal 10 at the transmitting end and a user's setting operation; the generating unit 24 that generates the coding setting information in accordance with the subjective quality information and the levels of priority; and the notifying unit 25 that notifies the coding setting information to the terminal 10 at the transmitting end.

Furthermore, a communication control method according to the embodiment is implemented by the terminal 10 that receives, from the different terminal 10, video data that is encoded in a scalable manner, decodes the received video data, and reproduces and outputs the decoded video data, and the communication control method includes acquiring subjective quality information in which the combination of values of multiple items related to the coding setting of video data is related to the evaluation result of the subjective quality with regard to video data; determining the levels of priority of the items in accordance with at least any one of the purpose of video data that is received from the different terminal 10 and a user's setting operation; generating coding setting information for determining the coding setting of video data that is received from the different terminal 10 in accordance with the subjective quality information and the levels of priority of the items; and notifying the coding setting information to the different terminal 10 that is the transmission source of the video data.

Moreover, the terminal-oriented program, that is provided by being contained in non-transitory computer-readable recording medium according to the embodiment, causes the terminal 10, which receives video data that is encoded in a scalable manner from the different terminal 10, decodes the received video data, and reproduces and outputs the decoded video data, to execute: acquiring subjective quality information in which the combination of values of multiple items related to the coding setting of video data is related to the evaluation result of the subjective quality with regard to video data; determining the levels of priority of the items in accordance with at least any one of the purpose of video data that is received from the different terminal 10 and a user's setting operation; generating coding setting information for determining the coding setting of video data that is received from the different terminal 10 in accordance with the subjective quality information and the levels of priority of the items; and notifying the coding setting information to the different terminal 10 that is the transmission source of the video data.

According to the present invention, it is possible to produce an advantage such that the coding setting can reflect the intentions of the receiving end that actually reproduces and outputs video data.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium (non-transitory computer-readable recording medium) for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device that receives, from a different communication device, video data that is encoded in a scalable manner, decodes received video data, and reproduces and outputs the decoded video data, the communication device comprising:

processing circuitry that
acquires subjective quality information in which a combination of values of multiple items related to a coding setting of video data is related to an evaluation result of a subjective quality with regard to the video data;
determines levels of priority of the items in accordance with at least any one of a purpose of video data that is received from the different communication device and a user's setting operation; and
generates coding setting information for determining a coding setting of video data that is received from the different communication device in accordance with the subjective quality information and the levels of priority of the items; and
a transmitter that notifies the coding setting information to the different communication device that is a transmission source of the video data,
wherein the processing circuitry acquires, from the different communication device that is a transmission source of video data, reception information that includes a bit rate of the video data that is received from the different communication device,
the subjective quality information is stored as information in which a combination of values of the items is related to an evaluation result of the subjective quality with respect to each bit rate of video data,
the processing circuitry acquires the subjective quality information that corresponds to a bit rate that is included in the reception information,
the items include a spatial resolution and a frame rate of video data,
the reception information further includes a maximum spatial resolution and a maximum frame rate of video data that is received from the different communication device, and
the processing circuitry acquires, from the subjective quality information that corresponds to a bit rate included in the reception information, the subjective quality information that contains a value that is equal to or less than a maximum spatial resolution included in the reception information as a value of an item of the spatial resolution and that contains a value equal to or less than a maximum frame rate included in the reception information as a value of an item of the frame rate.

2. The communication device according to claim 1, wherein
the items include an item related to a reproduction quality of video data and an item related to a reliability of video data.

3. The communication device according to claim 2, wherein
the item related to the reproduction quality includes a spatial resolution and a frame rate of video data.

4. The communication device according to claim 2, wherein
the item related to the reliability includes a number of layers of the spatial resolution of video data.

5. The communication device according to claim 1, further comprising:

a memory that stores therein, with respect to each purpose, multiple pieces of setting information in which levels of priority of the items are previously defined for each purpose of video data, wherein the processing circuitry determines the levels of priority of the items in accordance with the setting information that is selected by a user's setting operation from the pieces of setting information that correspond to a purpose of video data that is received from the different communication device.

6. A communication system, comprising:

a first communication device that encodes video data in a scalable manner and transmits encoded video data;

a second communication device that receives video data that is transmitted from the first communication device, decodes the received video data, and reproduces and outputs the decoded video data, wherein the first communication device includes first processing circuitry that encodes video data that is to be transmitted to the second communication device in accordance with a coding setting that is determined based on coding setting information that is notified by the second communication device, and the second communication device includes second processing circuitry that acquires subjective quality information in which a combination of values of multiple items related to a coding setting of video data is related to an evaluation result of a subjective quality with respect to video data, determines levels of priority of the items in accordance with at least any one of a purpose of video data that is received from the first communication device and a user's setting operation, and generates the coding setting information in accordance with the subjective quality information and the levels of priority, and a transmitter that notifies the coding setting information to the first communication device, wherein the second processing circuitry acquires, from the different communication device that is a transmission source of video data, reception information that includes a bit rate of the video data that is received from the different communication device, the second subjective quality information is stored as information in which a combination of values of the items is related to an evaluation result of the subjective quality with respect to each bit rate of video data, the second processing circuitry acquires the subjective quality information that corresponds to a bit rate that is included in the reception information, the items include a spatial resolution and a frame rate of video data, the reception information further includes a maximum spatial resolution and a maximum frame rate of video data that is received from the different communication device, and the second processing circuitry acquires, from the subjective quality information that corresponds to a bit rate included in the reception information, the subjective quality information that contains a value that is equal to or less than a maximum spatial resolution included in the reception information as a value of an item of the spatial resolution and that contains a value equal to or less than a maximum frame rate included in the reception information as a value of an item of the frame rate.

7. A communication control method that is implemented by a communication device that receives, from a different communication device, video data that is encoded in a scalable manner, decodes the received video data, and reproduces and outputs the decoded video data, the communication control method comprising:

acquiring subjective quality information in which a combination of values of multiple items related to a coding setting of video data is related to an evaluation result of a subjective quality with regard to the video data;

determining levels of priority of the items in accordance with at least any one of a purpose of video data that is received from the different communication device and a user's setting operation;

generating coding setting information for determining a coding setting of video data that is received from the different communication device in accordance with the subjective quality information and the levels of priority of the items; and notifying the coding setting information to the different communication device that is a transmission source of the video data, wherein the method further includes acquiring, from the different communication device that is a transmission source of video data, reception information that includes a bit rate of the video data that is received from the different communication device, the subjective quality information is stored as information in which a combination of values of the items is related to an evaluation result of the subjective quality with respect to each bit rate of video data, in the acquiring subjective-quality information, acquired is the subjective quality information that corresponds to a bit rate that is included in the reception information, the items include a spatial resolution and a frame rate of video data, the reception information further includes a maximum spatial resolution and a maximum frame rate of video data that is received from the different communication device, and in the acquiring subjective-quality information, from the subjective quality information that corresponds to a bit rate included in the reception information, acquired is the subjective quality information that contains a value that is equal to or less than a maximum spatial resolution included in the reception information as a value of an item of the spatial resolution and that contains a value equal to or less than a maximum frame rate included in the reception information as a value of an item of the frame rate.

8. The communication control method according to claim 7, wherein the items include an item related to a reproduction quality of video data and an item related to a reliability of video data.

9. The communication control method according to claim 8, wherein the item related to the reproduction quality includes a spatial resolution and a frame rate of video data.

10. The communication control method according to claim 8, wherein the item related to the reliability includes a number of layers of the spatial resolution of video data.

11. The communication control method according to claim 7, further comprising:

storing, with respect to each purpose, multiple pieces of setting information in which levels of priority of the items are previously defined for each purpose of video data, wherein in the determining, determined is the levels of priority of the items in accordance with the setting information that is selected by a user's setting operation from the pieces of setting information that correspond to a purpose of video data that is received from the different communication device.

* * * * *